United States Patent
Ball et al.

(10) Patent No.: US 6,902,195 B2
(45) Date of Patent: Jun. 7, 2005

(54) SEAT BELT PRETENSIONER

(75) Inventors: Keith R. Ball, Macomb Township, MI (US); Clare R. Cunningham, Mesa, AZ (US); Robert P. Ellis, Metamora, MI (US)

(73) Assignees: TRW Vehicle Safety Systems Inc., Lyndhurst, OH (US); TRW Inc., Lyndhurst, OH (US)

( * ) Notice: Subject to any disclaimer, the term of this patent is extended or adjusted under 35 U.S.C. 154(b) by 75 days.

(21) Appl. No.: 10/238,484

(22) Filed: Sep. 10, 2002

(65) Prior Publication Data

US 2004/0046382 A1 Mar. 11, 2004

(51) Int. Cl.[7] .............................................. B60R 22/46
(52) U.S. Cl. ....................................... 280/806; 297/480
(58) Field of Search ............................... 280/801.2, 806; 297/480, 476, 479

(56) References Cited

U.S. PATENT DOCUMENTS

| | | | | |
|---|---|---|---|---|
| 4,705,296 A | * | 11/1987 | Andersson et al. | 280/806 |
| 4,763,924 A | * | 8/1988 | Karlin et al. | 280/806 |
| 4,768,809 A | | 9/1988 | Andersson et al. | |
| 5,064,220 A | | 11/1991 | Ogawa | |
| 5,366,245 A | * | 11/1994 | Lane, Jr. | 280/806 |
| 5,671,949 A | | 9/1997 | Bauer et al. | |
| 5,984,357 A | | 11/1999 | Yasuda et al. | |
| 6,164,700 A | | 12/2000 | Masuda et al. | |
| 6,497,456 B1 | * | 12/2002 | Masuda et al. | 297/480 |

FOREIGN PATENT DOCUMENTS

JP          10181527 A  *  7/1998  ........... B60R/22/46

* cited by examiner

Primary Examiner—David R. Dunn
(74) Attorney, Agent, or Firm—Tarolli, Sundheim, Covell & Tummino L.L.P.

(57) ABSTRACT

A seat belt pretensioner mechanism (40) includes a part (36) for attachment to the seat belt (20). A strap (50) is connected to the part (36). A piston (78) and piston rod (58) are movable in a first direction to move the strap (50) and the part (36) to tension the seat belt (20). A pivot connection (59, 62) between the piston rod (58) and the strap (50) causes the strap to move with the piston rod. A cam (70) pivots the strap (50) about the pivot connection (59, 62) and effects movement of the part (36) toward the piston rod (58) as the piston (78) and the piston rod move in the first direction.

11 Claims, 2 Drawing Sheets

US 6,902,195 B2

SEAT BELT PRETENSIONER

TECHNICAL FIELD

The present invention relates to a seat belt pretensioner mechanism that applies a force to tension the seat belt in the event of a vehicle crash condition.

BACKGROUND OF THE INVENTION

A typical vehicle seat belt system includes seat belt webbing extensible about a vehicle occupant for helping to restrain the occupant in the event of a vehicle crash condition. It is known to use a pretensioner to apply a force to the seat belt in the event of a vehicle crash condition. Typically, the pretensioner includes a pyrotechnic device that is actuated when a crash condition is sensed.

SUMMARY OF THE INVENTION

The present invention is a seat belt pretensioner mechanism including a part for attachment to the seat belt. A strap is connected to the part. A piston and piston rod are movable in a first direction to move the strap and the part to tension the seat belt. A pivot connection between the piston rod and the strap causes the strap to move with the piston rod. A cam pivots the strap about the pivot connection. The strap and the part move toward the piston rod as the piston and the piston rod move in the first direction.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF THE INVENTION

Figure 1:
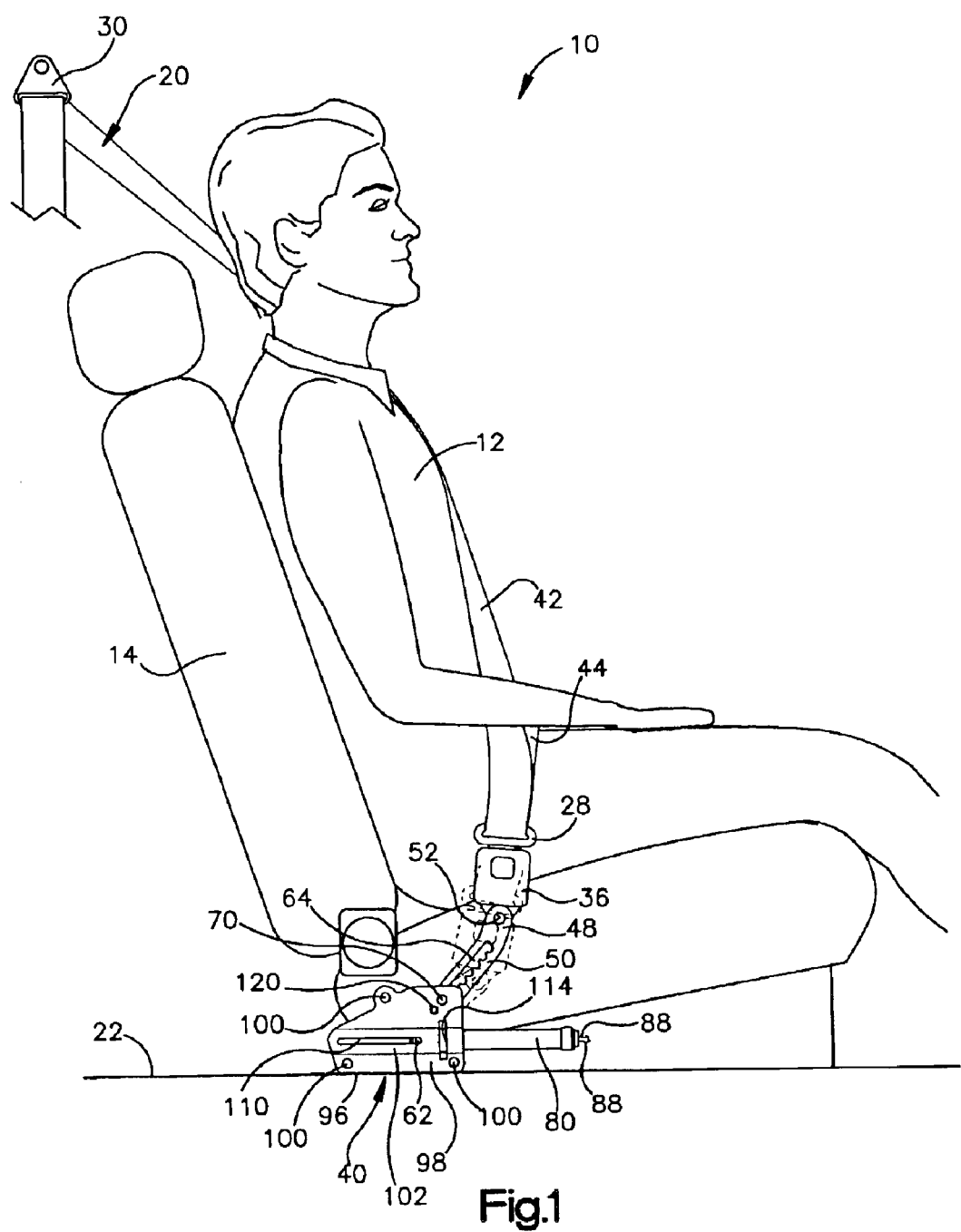
FIG. 1 is a schematic illustration of a vehicle occupant safety system having a seat belt pretensioner mechanism constructed in accordance with the present invention.

The present invention relates to a vehicle occupant safety system 10 (FIG. 1) for helping to protect an occupant 12 of a vehicle seat 14 during a vehicle crash condition. The vehicle occupant safety system 10 illustrated in FIG. 1 is a three-point continuous loop seat belt system for use in helping to restrain the occupant 12 of the vehicle in the vehicle seat 14. Those skilled in the art will recognize that the vehicle occupant safety system 10 may be a system other than a three-point continuous loop seat belt system.

The vehicle occupant safety system 10 includes a length of seat belt webbing 20 that is extensible about the occupant 12. One end of the length of seat belt webbing 20 (not shown) is anchored to the vehicle body 22, and an opposite end of the seat belt webbing 20 is attached to a seat belt retractor (not shown). A tongue assembly 28 is attached to the seat belt webbing 20 intermediate the ends of the seat belt webbing. The position of the tongue assembly 28 along the seat belt webbing 20 and relative to the ends of the seat belt webbing 20 is adjustable. The seat belt webbing 20 also extends through a D-ring 30 mounted to the vehicle.

When the occupant safety system 10 is not in use, the seat belt webbing 20 is wound onto the retractor. To engage the occupant safety system 10, the tongue assembly 28 is manually grasped and is pulled across the lap and torso of the occupant 12 seated in the seat 14. As the tongue assembly 28 is pulled, the seat belt webbing 20 is unwound from the retractor. The tongue assembly 28 is latched in a buckle part 36 of a seat belt pretensioner mechanism 40 connected to the vehicle body 22 on a side of the seat 14. The pretensioner mechanism 40 is connected to the vehicle body 26 in any suitable manner.

When the seat belt system 10 is latched or buckled, the length of seat belt webbing 20 is divided into a torso portion 42 and a lap portion 44. The torso portion 42 extends from the D-ring 30 to the tongue assembly 28 across the torso of the occupant 12. The lap portion 44 extends from the tongue assembly 28 and is anchored to the vehicle body 22 on a side of the seat 14 opposite from the pretensioner mechanism 40. The lap portion 44 extends across the lap of the occupant 12.

During the manual pulling of the tongue assembly 28 toward the buckle part 36, the tongue assembly moves along the seat belt webbing 20. The movement of the tongue assembly 28 relative to the seat belt webbing 20 assures that the lap portion 44 of the seat belt webbing fits snugly across the lap of the occupant 12.

The buckle part 36 (FIGS. 2 and 3) of the pretensioner mechanism 40 is connected to an end 48 of a rigid strap 50 by a fastener 52, such as a bolt or rivet. It is contemplated that the strap 50 may be formed as one piece with at least a portion of the buckle part 36, which normally is formed of multiple components. The strap 50 has an intermediate portion 54 extending at an angle to the end 48. An opposite end 56 extends at an angle to the intermediate portion 54. The end 48 and the intermediate portion 54 have a first width and the end 56 has a second width smaller than the first width.

Figure 2:
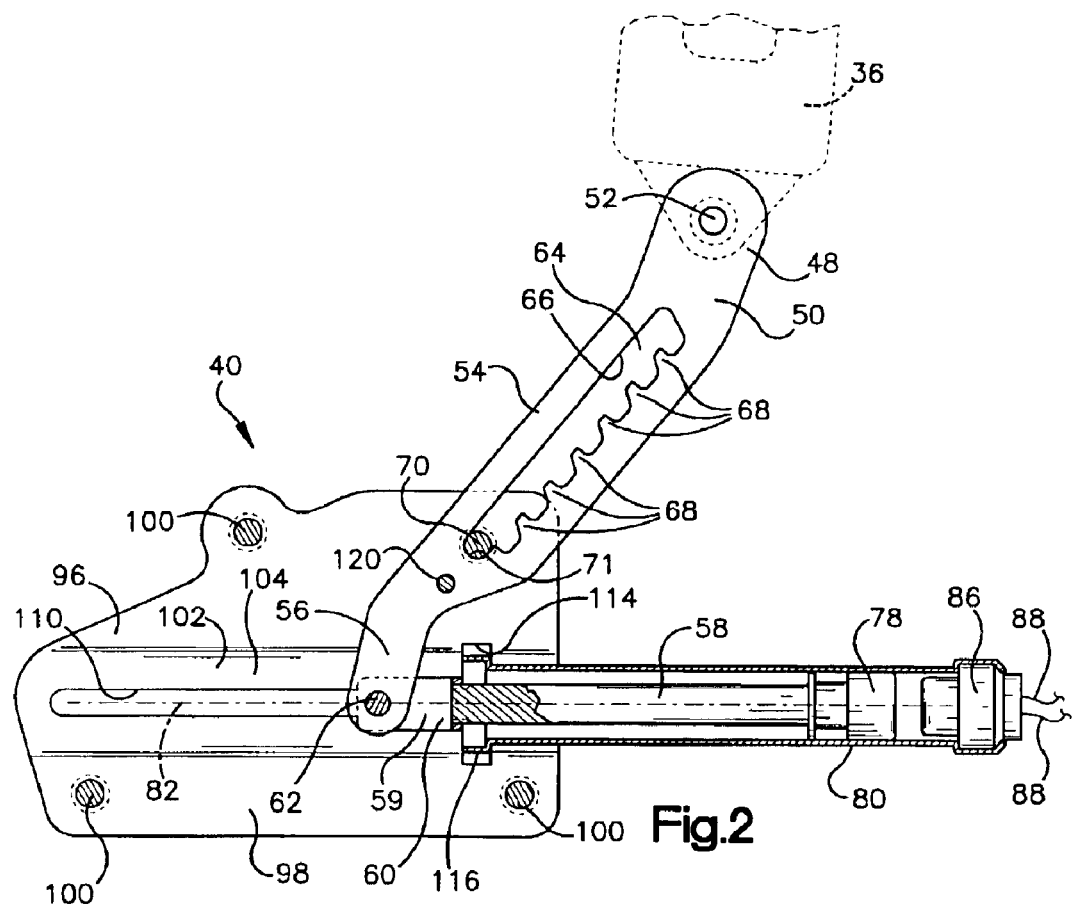
FIG. 2 is a cross-sectional view of the seat belt pretensioner mechanism of FIG. 1 showing the pretensioner mechanism in an unactuated condition.
Figure 3:
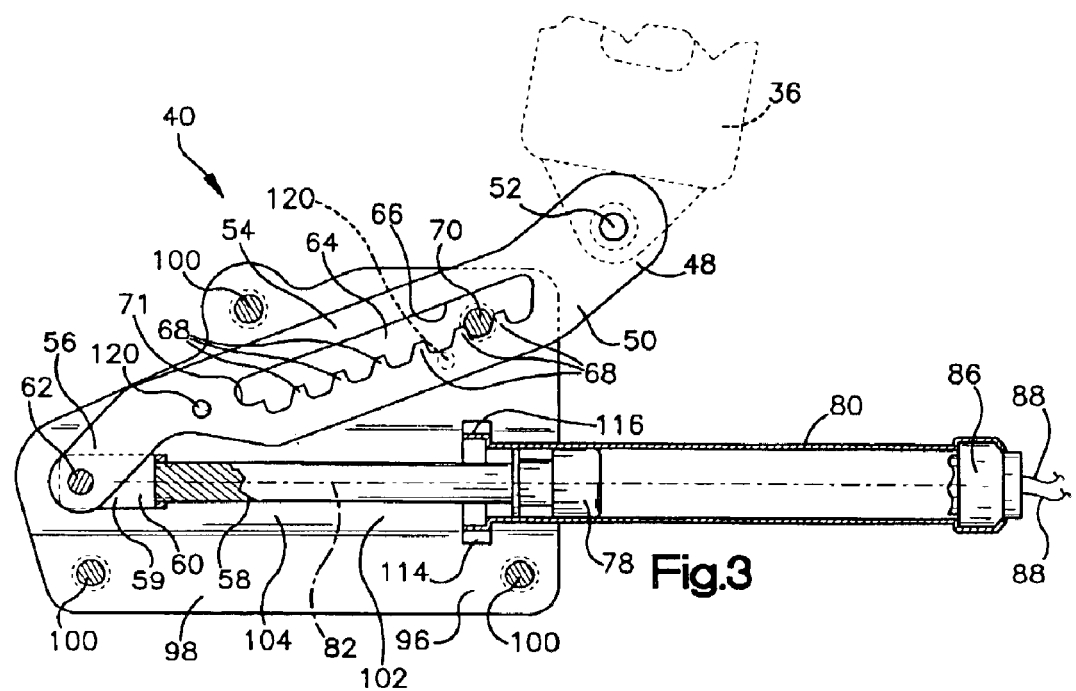
FIG. 3 is a cross-sectional view of the seat belt pretensioner mechanism showing the pretensioner mechanism in an actuated condition.

The end 56 of the strap 50 is pivotally connected to a movable piston rod 58 by a clevis 59. The clevis 59 has a pair of plate portions 60 extending parallel to each other, one of which is shown in FIGS. 2 and 3. The plate portions 60 of the clevis 59 are fixedly connected to the piston rod 58, such as by welding. Alternatively, the clevis 59 could be formed as one piece with the piston rod 58. The end 56 of the strap 50 extends between the plate portions 60 of the clevis 59. A pivot shaft 62 extends through the end 56 of the strap 50 and the plate portions 60 of the clevis 59 to connect the strap pivotally to the clevis.

The strap 50 has a slot 64 in the intermediate portion 54 defined by a side surface 66 of the strap. Projections 68 on the strap 50 extend into the slot 64. As shown in FIG. 2, there are six equally spaced apart projections 68, but it is contemplated that any number of projections may extend into the slot 64. A cam 70, such as a rivet, extends into the slot 64 and engages the side surface 66 of the strap 50. The cam 70 pivots the strap 50 toward the piston rod 58 as the piston rod moves. The cam 70 is located in a lower end 71 of the slot 64 when the pretensioner 40 is in an unactuated condition, as seen in FIG. 2.

The piston rod 58 is connected with a piston 78. The piston rod 58 and piston 78 extend into a cylinder 80. The piston rod 58 and piston 78 are movable along a longitudinal axis 82 of the piston rod relative to the cylinder 80 from the unactuated condition, shown in FIG. 2, to an actuated condition, shown in FIG. 3. The piston rod 58 and piston 78 move to the left, as viewed in FIG. 2, to move the strap 50 and the buckle part 36 to tension the seat belt 20.

A gas generator 86 is connected with an end of the cylinder 80. The gas generator 86 produces pressurized gas in the cylinder 80 to move the piston 78 and piston rod 58 relative to the cylinder. The gas generator 86 has leads 88 for receiving a signal from a sensor (not shown) to activate the gas generator in the event of a vehicle crash condition, as known in the art.

A mounting member 96 (FIG. 1) connects the pretensioner mechanism 40 to the vehicle body 22. The mounting member 96 includes a pair of plates 98, one of which is shown in FIGS. 2 and 3, connected together by rivets 100 and the cam 70. The strap 50 extends between the plates 96. The piston rod 58 and clevis 59 are movable along the axis 82 between the plates 98. Each of the plates 98 has a semi-cylindrical projection 102 that projects into or out of the plane of FIG. 2 or FIG. 3 and that defines a cylindrical space 104 between the plates. The piston rod 58 and the clevis 59 move in the space 104 between the plates 98.

The plates 98 are mirror images of each other and, therefore, only one plate 98 will be described in detail. The plate 98 has a slot 110 in the projection 102 (FIGS. 1 and 2) through which the pivot shaft 62 extends. The slot 110 guides movement of the piston 78 and the piston rod 58 in the direction along the longitudinal axis 82. The plate 98 (FIGS. 2 and 3) also has a slot 114 extending in a direction transverse to the longitudinal axis 82. The slot 114 receives an annular flange 116 of the cylinder 80. The flange 116 extends into the slot 114 to help retain the cylinder 80 between the plates 98.

A shear pin 120 (FIGS. 1 and 2) extends through the plates 98 and the strap 50. The shear pin 120 helps retain the strap 50 in the unactuated condition, shown in FIG. 2. The strap 50 shears the pin 120 upon movement of the piston rod 58 and the piston 78 relative to the mounting member 96.

When a sensor (not shown) senses a vehicle crash condition, the gas generator 86 is activated. When the gas generator 86 is activated, the piston 78 and piston rod 58 move along the longitudinal axis 82 to the left, as viewed in FIG. 2. Upon movement of the piston 78 and the piston rod 58, the strap 50 and the buckle part 36 are moved from the position shown in FIG. 2 toward the piston rod. The pin 120 is sheared by the strap 50 to release the strap and buckle part 36 for movement relative to the mounting member 96. As the piston 78 and piston rod 58 move along the axis 82, the cam 70 engages the side surface 66 of the strap 50 to pivot the strap and the buckle part 36 relative to the piston rod and toward the piston rod to tension the belt 20.

When a force is applied to the seat belt 20 that urges the buckle part 36 and the strap 50 in a direction away from the piston rod 58 after the seat belt has been tensioned, one of the projections 68 on the strap engages the cam 70 to prevent further movement of the buckle part 36 and the strap away from the piston rod, as shown in FIG. 3. When the force is applied to urge the strap 50 away from the piston rod 58, the strap pivots about the pivot pin 62. The side surface 66 moves out of engagement with the cam 70 and one of the projections 68 moves into engagement with the cam. Accordingly, the cam 70 prevents the buckle part 36 and the strap 50 from moving away from the piston rod 58. Also, the cam 70 prevents the piston 78 and the piston rod 58 from moving to the right, as viewed in FIG. 3, relative to the mounting member 96.

Although the strap 50 is shown as being connected to a buckle part 36, it is contemplated that the strap could be connected to an end of the seat belt 20 or to the retractor.

From the above description of the invention, those skilled in the art will perceive improvements, changes and modifications. Such improvements, changes and modifications within the skill of the art are intended to be covered by the appended claims.

What is claimed is:

1. A seat belt pretensioner mechanism comprising:
   a part for attachment to the seat belt;
   a strap directly connected to said part;
   a piston and piston rod movable in a first direction to move said strap and said part to tension the seat belt;
   a pivot connection between said piston rod and said strap for causing said strap to move with said piston rod; and
   a cam for pivoting said strap about said pivot connection and for effecting movement of said part toward said piston rod in response to said piston and said piston rod moving in the first direction;
   said part and said piston rod being connected together by only said strap.

2. A seat belt pretensioner mechanism as defined in claim 1 further including a mounting member connectable to a vehicle for mounting said pretensioner mechanism to the vehicle.

3. A seat belt pretensioner mechanism as defined in claim 2 wherein said mounting member has a slot for guiding movement of said piston and said piston rod in the first direction.

4. A seat belt pretensioner mechanism as defined in claim 2 wherein said mounting member includes a pair of plates connected to each other and fixedly connected to the vehicle, said piston rod being movable in the first direction between said plates.

5. A seat belt pretensioner mechanism as defined in claim 1 wherein said pivot connection includes a clevis connected to said piston rod that pivotally connects said strap to said piston rod.

6. A seat belt pretensioner mechanism comprising:
   a part for attachment to the seat belt;
   a strap connected to said part;
   a piston and piston rod movable in a first direction to move said strap and said part to tension the seat belt;
   a pivot connection between said piston rod and said strap for causing said strap to move with said piston rod;
   a cam for pivoting said strap about said pivot connection and for effecting movement of said part toward said piston rod as said piston and said piston rod move in the first direction;
   said strap including a slot, said cam extending into said slot and engaging a side surface defining said slot to pivot said strap and said part toward said piston rod as said piston and said piston rod move; and
   projections extending into said slot in said strap and engageable with said cam to prevent movement of said piston and said piston rod in a direction opposite to the first direction.

7. A seat belt pretensioner mechanism comprising:
   a part for attachment to the seat belt;
   a strap connected to said part;
   a piston and piston rod movable in a first direction to move said strap and said part to tension the seat belt;
   a pivot connection between said piston rod and said strap for causing said strap to move with said piston rod; and
   a cam for pivoting said strap about said pivot connection and for effecting movement of said part toward said piston rod as said piston and said piston rod move in the first direction; and a mounting member connectable to a vehicle for mounting said pretensioner mechanism to the vehicle, said mounting member having a slot for guiding movement of said piston and said piston rod in the first direction;

said pivot connection including a pivot shaft extending into said slot in said mounting member to guide movement of said piston and said piston rod in the first direction.

8. A seat belt pretensioner mechanism comprising:

a part for attachment to the seat belt;

a strap connected to said part;

a piston and piston rod movable in a first direction to move said strap and said part to tension the seat belt;

a pivot connection between said piston rod and said strap for causing said strap to move with said piston rod; and a cam for pivoting said strap about said pivot connection and for effecting movement of said part toward said piston rod as said piston and said piston rod move in the first direction;

a mounting member connectable to a vehicle for mounting said pretensioner mechanism to the vehicle, said mounting member including a pair of plates connected to each other, said piston rod being movable in the first direction between said plates; and a cylinder connected to said plates in which said piston and said piston rod are movable, said cylinder having an annular flange extending into slots in said plates.

9. A seat belt pretensioner mechanism comprising:

a part for attachment to the seat belt;

a strap connected to said part;

a piston and piston rod movable in a first direction to move said strap and said part to tension the seat belt;

a pivot connection between said piston rod and said strap for causing said strap to move with said piston rod; and a cam for pivoting said strap about said pivot connection and for effecting movement of said part toward said piston rod as said piston and said piston rod move in the first direction;

a mounting member connectable to a vehicle for mounting said pretensioner mechanism to the vehicle; and a shear pin extending through said strap and said mounting member preventing movement of said strap, said shear pin being sheared by said strap upon movement of said piston and said piston rod in the first direction.

10. A seat belt pretensioner mechanism comprising:

a part for attachment to the seat belt;

a strap connected to said part;

a piston and piston rod movable in a first direction to move said strap and said part to tension the seat belt;

a pivot connection between said piston rod and said strap for causing said strap to move with said piston rod; and a cam for pivoting said strap about said pivot connection and for effecting movement of said part toward said piston rod in response to said piston and said piston rod moving in the first direction;

said strap including a slot, said cam extending into said slot and engaging a side surface defining said slot to pivot said strap and said part toward said piston rod as said piston and said piston rod move and said strap and said cam move relative to each other.

11. A seat belt pretensioner mechanism as defined in claim 10 wherein said cam includes a rivet extending into said slot.

* * * * *